US006955246B2

(12) United States Patent
Norman et al.

(10) Patent No.: US 6,955,246 B2
(45) Date of Patent: Oct. 18, 2005

(54) RAPID TAKE UP AND VIBRATION PROOF ADJUSTER MECHANISM

(75) Inventors: Mark Anthony Norman, Bridgend (GB); Martin Taylor, Cwmbran (GB)

(73) Assignee: ArvinMeritor Technology, LLC, Troy, MI (US)

(*) Notice: Subject to any disclaimer, the term of this patent is extended or adjusted under 35 U.S.C. 154(b) by 0 days.

(21) Appl. No.: 10/355,511

(22) Filed: Jan. 31, 2003

(65) Prior Publication Data

US 2004/0149527 A1 Aug. 5, 2004

(51) Int. Cl.[7] .............................................. F16D 55/02
(52) U.S. Cl. ................... 188/71.8; 188/72.8; 188/72.9; 188/217
(58) Field of Search .............................. 188/71.8, 72.6, 188/72.8, 72.7, 72.9, 71.9, 72.4, 73.45, 79.55, 188/106 F, 217, 196 BA

(56) References Cited

U.S. PATENT DOCUMENTS

| 4,154,321 A | 5/1979 | Falk |
| 4,499,976 A | 2/1985 | Weber |
| 4,846,314 A | 7/1989 | Nishikawa |
| 5,433,298 A * | 7/1995 | Antony et al. ............. 188/72.7 |
| 5,568,845 A * | 10/1996 | Baumgartner et al. ..... 188/71.9 |
| 5,582,273 A | 12/1996 | Baumgartner, et al. |
| 5,819,884 A * | 10/1998 | Giering ...................... 188/71.9 |
| 5,833,035 A | 11/1998 | Severinsson |
| 5,992,579 A | 11/1999 | Kyrtsos |
| RE37,231 E | 6/2001 | Severinsson |
| 6,435,319 B1 | 8/2002 | Thomas, et al. |
| 6,668,981 B2 * | 12/2003 | Ortegren et al. ........... 188/72.2 |

FOREIGN PATENT DOCUMENTS

| EP | 0 648 952 A | 4/1995 |
| EP | 1 160 476 A | 12/2001 |

* cited by examiner

Primary Examiner—Xuan Lan Nguyen
(74) Attorney, Agent, or Firm—Carlson, Gaskey & Olds

(57) ABSTRACT

A slack adjustment system for a disk brake includes a biasing member to adjust slack in a brake system. The biasing member operates independently of pressure applied to a brake actuator. A locking device secures the adjustment mechanism in place when adjustment is not necessary. Release of the locking member allows the biasing member to adjust the resting position of brake pads independent of driver applied brake pressure.

11 Claims, 4 Drawing Sheets

RAPID TAKE UP AND VIBRATION PROOF ADJUSTER MECHANISM

BACKGROUND OF THE INVENTION

The present invention relates to an adjuster mechanism for a brake.

As brake pads or brake disc wear the gap between the pads and brake disc increases. Due to the increase in distance between the brake pads and the brake disc the brake actuator must travel farther to engage the brake. In other words, there is more slack when the brake is applied which causes the brakes to become less effective. In order to compensate for slack, a slack adjustment mechanism moves the brake pads closer to the brake disc prior to brake engagement. Adjusting the length of the load bearing components assures a consistent amount of actuator travel in spite of brake pad wear.

Conventional brake adjuster mechanisms use relatively complex mechanical assemblies to perform this function. Force from the brake actuator is commonly utilized to drive the adjuster mechanism, which may reduce brake effectiveness and efficiency.

In addition, the adjuster mechanism may shift while the brake is not being applied. Shifting may cause undesirable brake pad wear, or further increase slack in the brake system which may reduce the brake performance.

Accordingly, it is desirable to provide an adjuster mechanism which does not increase driver effort, and which is securely restrained when the brake is not being utilized.

SUMMARY OF THE INVENTION

The slack adjustment system according to the present invention provides an adjustment mechanism which utilizes a biasing member to adjust slack in a system. The biasing member operates independently of the pressure applied to a brake actuator. A locking mechanism is utilized to secure the adjustment mechanism in place when adjustment is not necessary. Additionally, the locking mechanism controls the desired amount of slack.

The locking mechanism selectively engages a tappet or any rotational member engaged with said tappet to prevent the tappet from being rotated and unnecessarily adjusting the gap between the brake pad and the brake disc. A latch interfitting with the tappet prevents rotation when engaged with the tappet. The latch disengages from the tappet after a predetermined movement of the tappet. Release of the locking mechanism allows the tappet to rotate. The biasing member is mounted to engage and rotate the tappet when the locking member is not preventing movement. The biasing member is of a type which applies a rotational force to the thrust assembly independent of the amount of pressure applied to the brake actuator. The biasing member may be a spring, electric motor, air powered motor or the like.

The present invention therefore provides a method of automatically adjusting slack independent of the pressure applied to the brake system by the driver. In addition, a locking device prevents unintentional adjustment of slack in the brake system.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
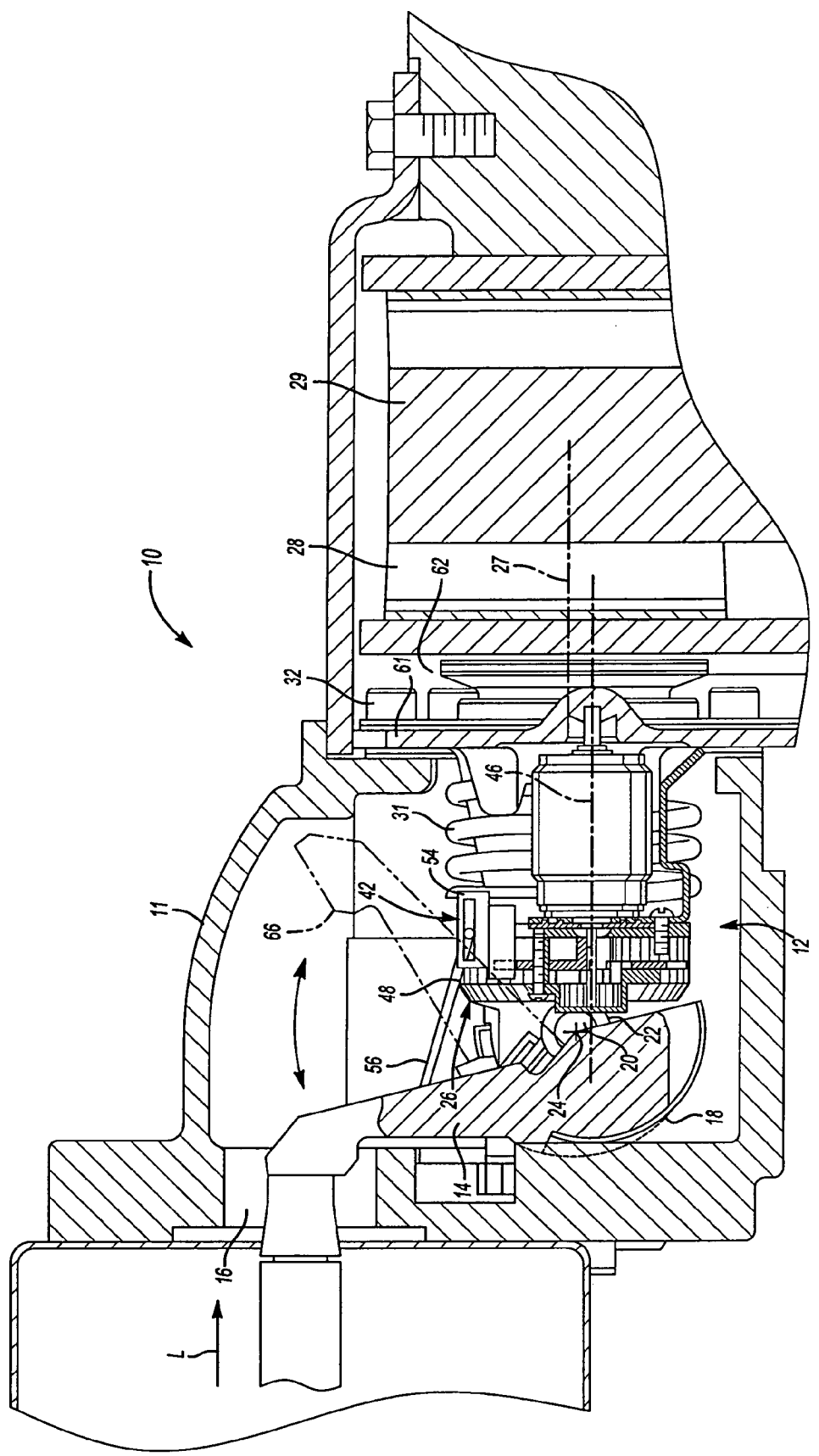
FIG. 1 is a sectional side-view of a brake assembly with a slack adjustment system according to the present invention.

FIG. 1 illustrates a disc brake assembly 10 which utilizes a slack adjustment system 12 of the present invention. The disc brake assembly 10 has a frame 11, which encloses the internal components and bears the loads generated by them. As a driver operates a brake (not shown) an input load (schematically illustrated by arrow L) is transferred to a lever 14, through opening 16 in the frame 11. The lever 14 is rotatably supported by the frame 11 through a bearing 18. The lever rotates about a lever axis 20. That is, the lever 14 rotates clockwise about the lever axis 20, as illustrated in FIG. 1. The base of the lever 14 is recessed to hold cylindrical roller 22. The roller 22 is eccentrically centered relative the center of rotation of the lever 14. That is, the roller axis 24 moves in an arc around the lever axis 20.

The input load L causes the lever 14 to rotate about the lever axis 20 and the roller 22 to move in an arc around the lever axis 20 (the position illustrated in phantom shows the extreme of travel available to the lever 14). The eccentric movement of the roller 22 engages one or more thrust assemblies 26 and applies a load to the thrust assemblies 26 causing the thrust assemblies 26 to move perpendicularly away from the lever 14, guided by a housing 61. The preferred embodiment, shown in FIG. 2, includes two thrust assemblies 26. This motion defines a thrust axis 27 perpendicular to the lever and roller axes 20, 24. The axial movement of the thrust assemblies 26 along the thrust axis 27 engages the brake pad 28 through the thrust plate 62. The brake pad 28 engages the brake disc 29. When the driver releases the brake, actuator input load L is reduced and return spring 31 drives the thrust assemblies 26 to the original position. The lever 14 and roller 22 also return to the original position. The return spring 31 restrains the thrust assemblies 26, roller 22 and lever 14 in the original position when no input load L is being applied.

The thrust assembly 26 is guided by a housing 61 that is attached to frame 11 by fasteners 32, (only one shown). The thrust assemblies 26 consists of internally threaded tappet nuts 63 and externally threaded tappet screws 64. The tappet nuts 63 are rotationally constrained by the housing 61, such that when the tappet screws 64 are rotated, the length of the thrust assemblies 26 along the thrust axis 27 is altered. The length of the two thrust assemblies 26 may be synchronized by a rotational member 48, which is permanently engaged with the two tappet screws 64.

Figure 2:
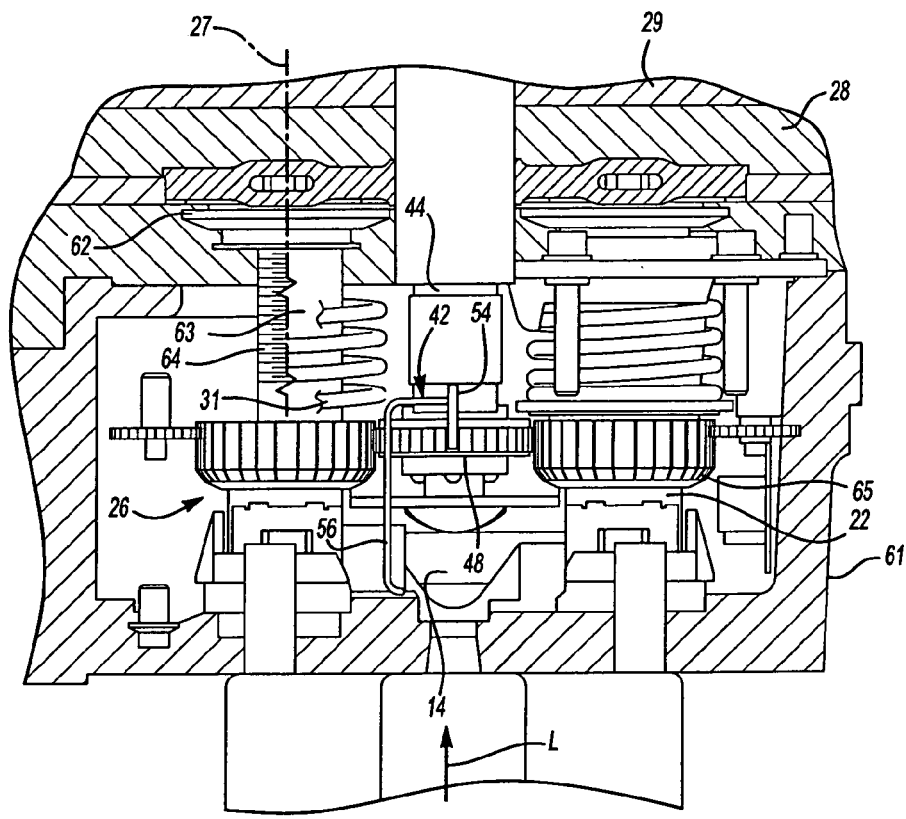
FIG. 2 is a sectional plan-view of a brake assembly.

Referring to FIG. 2, the locking mechanism 42 selectively engages the gear on the tappet screw 64 to prevent the tappet screw 64 from being rotated and unnecessarily adjusting the gap between the brake pad 28 and the brake disc 29. A latch 54 intermitting with the rotational member 48 prevents rotation when the brake is not applied, and when the brake is applied but the thrust assemblies 26 have moved by less than the pre-defined slack. The latch 54 is mounted to a link 56, which may be a rod or the like, which is mounted to lever 14.

Figure 3:
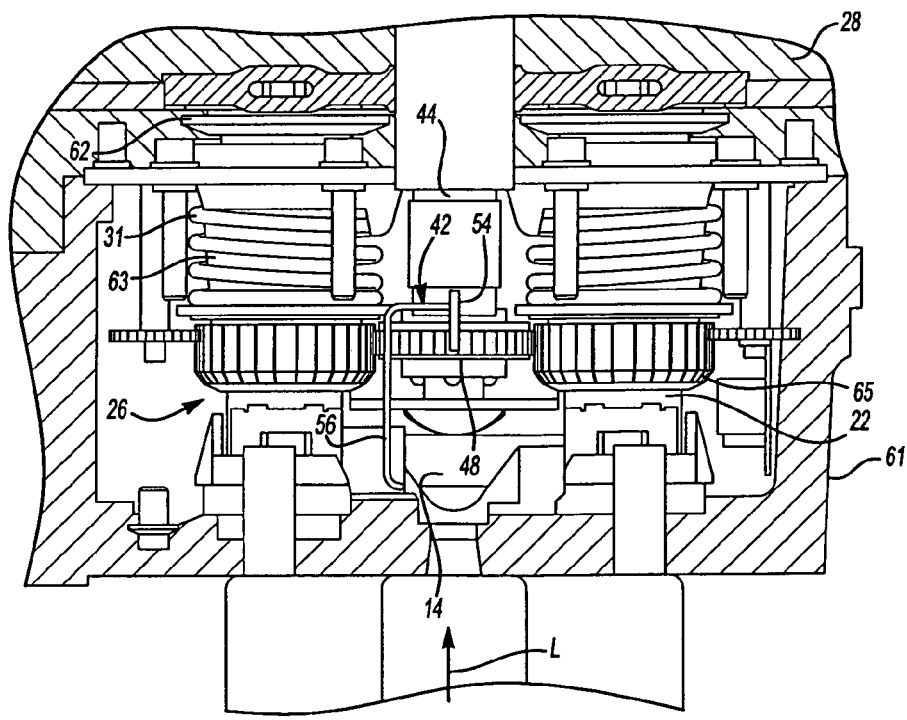
FIG. 3 is a sectional plan-view of the slack adjustment system according to the present invention showing the tappet moved forward by a distance equal to the desired amount of slack, with the latch just disengaged from the rotational member.
Figure 4:
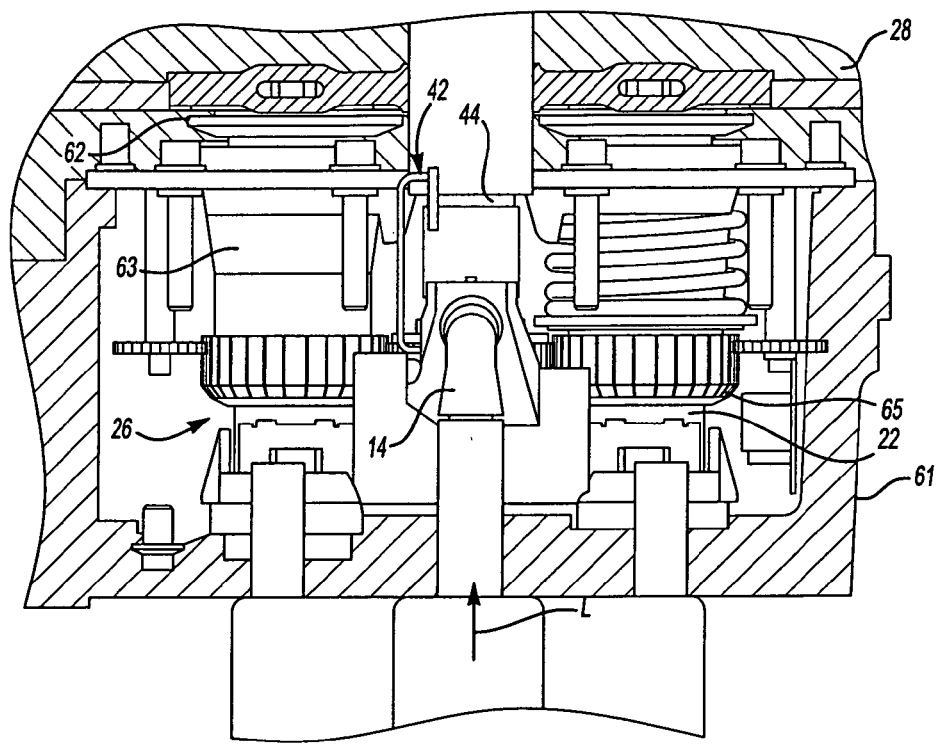
FIG. 4 is a sectional plan view of the slack adjustment system according to the present invention showing all components in the brake fully applied position.

When the brake is not applied, or during normal braking movement when the thrust assemblies 26 have moved through less than the pre-defined amount of slack and no adjustment is required, the rotational member 48 and tappet screws 64 may be locked from rotation by a locking mechanism 42. When the locking mechanism 42 is engaged, the rotational member 48 and tappet screws 64 cannot rotate. The force applied to tappet screws 64 by rotation of lever 14 axially drives the thrust assemblies 26 along the thrust axis 27 toward the brake disc 29. The locking mechanism 42, consisting of a latch 54 driven by the lever 14 via a link 56, moves relative to the gear on the outside of the rotational member 48 (shown in FIG. 3 to be moving along an axis parallel to the thrust axis 27, but alternatively could be moved radially away from the thrust axis 27 by re-arranging the connecting link 56). The point at which the latch 54 disengages is determined by the geometry of the link 56. When the pre-defined slack between the brake pads 28 and disc 29 has been taken up, the latch 54 disengages from the gear on the rotational member 48. Simultaneously, load starts to be applied to the brake pad 28 via the thrust assemblies 26. This load produces a friction torque between the tappet nuts 63 and tappet screws 64, preventing any relative rotation and, hence, adjustment when the brake is applied, shown in FIG. 4. When the brake is released, all components are returned to their original positions by the return spring 31 with no adjustment of the length of the thrust assemblies 26 having taken place.

As the brake pad 28 wears away, the slack between the brake pad 28 and the thrust assemblies 26 increases, and the thrust assemblies 26 must move a greater distance along the thrust axis 27 in order to engage the brake pad 28 with the brake disc 29. To compensate for the wear on the brake pad 28, the tappet screws 64 are adjusted to increase the overall length of the thrust assembly 26, resulting in a constant slack being maintained between the brake pad 28 and brake disc 29.

Figure 5:
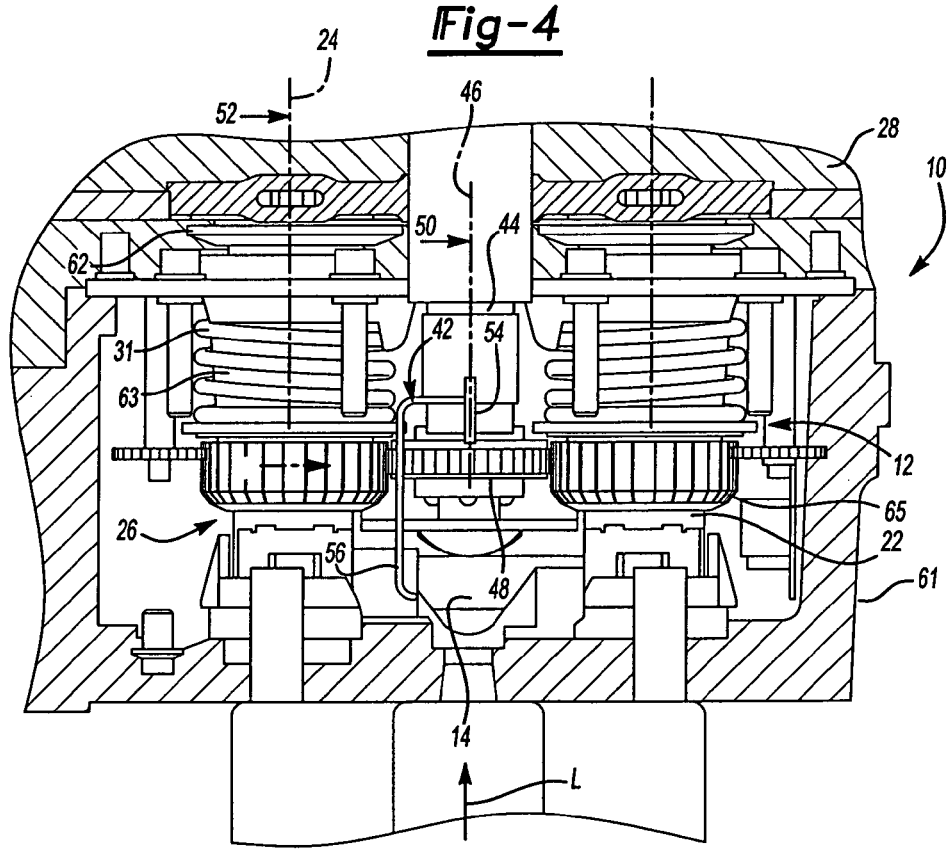
FIG. 5 is a sectional plan-view of the slack adjustment system according to the present invention shown in the locked position.

Referring to FIG. 5, the slack adjustment system 12 of the present invention is utilized to adjust the slack in the disc brake assembly 10. When the locking mechanism 42 is released the rotational member 48 and tappet screws 64 can rotate. A biasing member 44 is mounted in the housing 61, and applies a biasing torque to the rotational member 48. A biasing axis 46 is preferably parallel to and offset from the thrust axis 27, but could be in any position or angle inside or outside the frame 11 where it can still be engaged directly or indirectly to the tappet screws 64. The biasing member 44 is preferably a coil spring but may take other forms such as an electric motor, air motor, or the like. The rotational member 48 is mounted about the biasing member 44 and is driven by the biasing member 44 in a first rotational direction 50 about the biasing axis 46. The rotational member 48 engages with the gears on the tappet screws 64 preferably by gears on the tappet, but other means of engagement may be used. The tappet screws 64 rotate about the thrust axis 27 in a second rotational direction 52. That is, rotational member 48 rotates in a counter-clockwise direction, which rotates the tappet screws 64 in a clockwise direction, as illustrated in FIG. 5. The rotational member 48 is preferably a gear.

Rotation of the tappet screws 64 causes the tappet nuts 63 to move toward the brake pad 28, thereby lengthening the thrust assemblies 26 and decreasing the slack.

Figure 6:
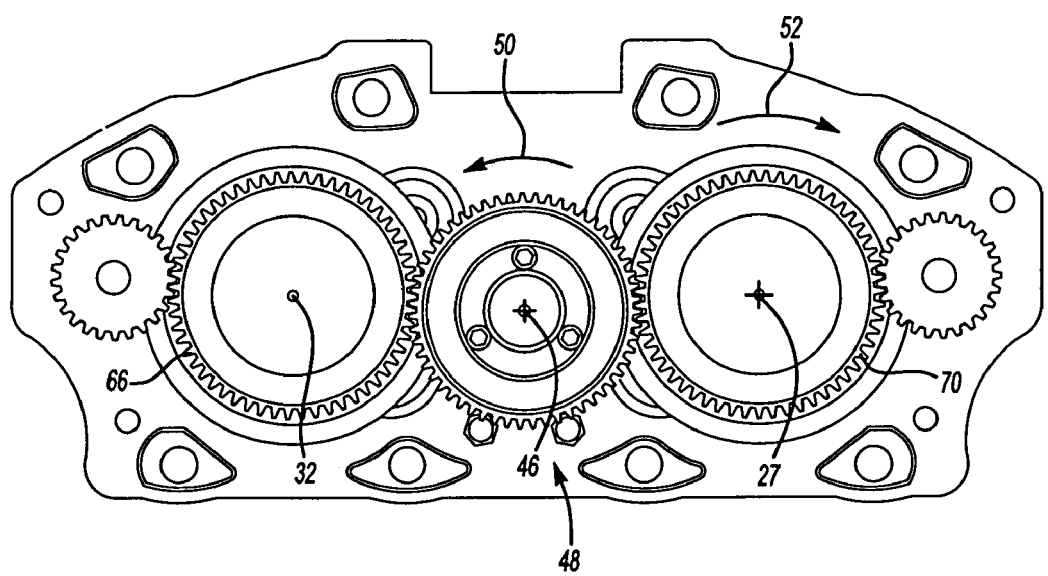
FIG. 6 is a sectional end-view of the rotational member and tappet gear-train showing the preferred directions of rotation.

When the brake is applied, the latch 54 disengages with the rotational member 48 after the thrust assembly 26 has moved through the pre-defined slack. If there is excess slack, the tappet screw 64 is free to rotate and is driven in the clockwise in the second rotational direction 52, lengthening the thrust assemblies 26 and reducing the slack. When the thrust assembly 26, brake pad 28 and brake disc 29 are in contact and load is applied through the thrust assemblies 26, a friction torque is produced between the tappet nuts 63 and tappet screws 64, preventing any relative rotation and, hence, adjustment when the brake is applied. The preferred directions of rotation are shown in FIG. 6.

When the brake is released, if there is still excess slack when all load is released from the thrust assemblies 26, the rotational member 48 and tappet screws 64 will be rotated further as described in the previous paragraph. It will continue to rotate until the travel of the thrust assembly 26 becomes equal to the predefined slack. The latch 54 then re-engages with the gear on the rotational member 48, preventing any further rotation and, hence, adjustment of the length of the thrust assemblies 26.

The foregoing description is only illustrative of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A slack adjustment system for a disc brake comprising:
a lever mounted for rotation about a lever axis;
a biasing member mounted for rotation about a biasing axis, perpendicular to said lever axis,
a rotational member mounted to said biasing member, said biasing member biasing said rotational member in a first direction about said biasing axis;
at least one tappet engaged with said rotational member for rotation in a second direction about a thrust axis parallel to said biasing axis; and
a locking mechanism mounted to said lever to selectively engage said at least one tappet to prevent rotation thereof, said rotational member and said at least one tappet being gears; and
said locking mechanism couples with teeth of said rotational member.

2. The system as recited in claim 1, wherein said locking mechanism disengages said at least one tappet in response to rotation of said lever about said lever axis.

3. The system as recited in claim 2, wherein a threaded shaft is rotated about said thrust axis by said at least one tappet in response to disengagement of said locking mechanism from said at least one tappet.

4. The system as recited in claim 3, wherein said at least one tappet is prevented from rotation when a brake is fully engaged.

5. The system as recited in claim 3, wherein a thrust assembly is lengthened along said thrust axis in response to rotation of said threaded shaft.

6. The system as recited in claim 5, wherein said at least one tappet is prevented from rotation by contact of a thrust plate with a brake pad.

7. The system as recited in claim 1, wherein said biasing member comprises a spring.

8. The system as recited in claim 1, wherein said biasing member comprises a coil spring.

9. The system as recited in claim 1, wherein said locking mechanism is a latch.

10. The system as recited in claim 1, wherein a rod supports and attaches said locking mechanism to said lever.

11. The system as recited in claim 1, wherein at least one tappet comprises two tappets.

* * * * *